(12) United States Patent
Galomb

(10) Patent No.: US 7,153,026 B2
(45) Date of Patent: *Dec. 26, 2006

(54) SYSTEM AND PACKAGE FOR DISPENSING FLOWABLE MATERIAL AND METHOD FOR PRODUCT DISPENSING

(75) Inventor: David E. Galomb, Allentown, PA (US)

(73) Assignee: Fres-co System USA, Inc., Telford, PA (US)

( * ) Notice: Subject to any disclaimer, the term of this patent is extended or adjusted under 35 U.S.C. 154(b) by 374 days.

This patent is subject to a terminal disclaimer.

(21) Appl. No.: 10/664,620

(22) Filed: Sep. 19, 2003

(65) Prior Publication Data

US 2004/0188457 A1 Sep. 30, 2004

Related U.S. Application Data

(60) Provisional application No. 60/457,430, filed on Mar. 25, 2003.

(51) Int. Cl.
*B65D 30/18* (2006.01)
*B65D 33/16* (2006.01)
*B65D 33/06* (2006.01)

(52) U.S. Cl. .................. 383/122; 383/67; 383/202

(58) Field of Classification Search ................ 383/104, 383/122, 67, 202
See application file for complete search history.

(56) References Cited

U.S. PATENT DOCUMENTS

| 3,380,646 | A | * | 4/1968 | Doyen et al. ................ 383/104 |
| 3,549,451 | A | * | 12/1970 | Kugler .................... 156/275.1 |
| 3,604,491 | A | * | 9/1971 | Spiess .......................... 383/80 |
| 3,935,993 | A | * | 2/1976 | Doyen et al. ................. 383/94 |
| 4,353,497 | A | * | 10/1982 | Bustin ........................ 383/104 |
| 4,361,235 | A | * | 11/1982 | Gautier ....................... 206/527 |
| 4,837,849 | A | * | 6/1989 | Erickson et al. ............ 383/104 |
| 5,549,389 | A | * | 8/1996 | Takagaki et al. ............ 383/202 |
| 5,638,988 | A |  | 6/1997 | Rogers et al. |
| 6,231,237 | B1 | * | 5/2001 | Geller ........................ 383/119 |
| 6,265,038 | B1 | * | 7/2001 | Frisk .......................... 428/34.7 |
| 6,953,069 | B1 | * | 10/2005 | Galomb ...................... 141/330 |
| 2003/0059130 | A1 | * | 3/2003 | Yoneyama et al. ........... 383/10 |

OTHER PUBLICATIONS

Page 18 from a brochure of Deere & Company bearing the legend "DKA139 Litho in U.S.A. (93-11)." This page mentions the "Lid Fill Closed Handling System" and shows a "Lock 'N Load" container in a photograph.

Page 25 from a brochure of Deere & Company bearing the legend "DKA15 Litho in U.S.A. (90-08)." This page shows a "Lid Fill Closed Handling System."

(Continued)

*Primary Examiner*—Jes F. Pascua
(74) *Attorney, Agent, or Firm*—Caesar, Rivise, Bernstein, Cohen & Pokotilow, Ltd.

(57) ABSTRACT

A system for dispensing flowable materials from a package. The system basically comprises the package and a receiver apparatus. The receiver apparatus includes a hollow interior chamber, e.g., a hopper, a penetrating assembly e.g., plural blades, fixedly mounted with respect to the chamber, and an outlet. The package, e.g., a flexible package, has a hollow interior in which the flowable material is located and includes at least one wall portion, e.g., a bottom wall, arranged to be penetrated by the penetrating assembly, whereupon the flowable material is enabled to flow out of the package for ultimate dispensing out of an outlet of the chamber.

8 Claims, 14 Drawing Sheets

OTHER PUBLICATIONS

Printout of web page of Amvac Chemical Corporation showing its "SmartBox" container system.

Press release dated Feb. 7, 2003 re "Closed Handling Systems for Thimet® and Phorate Improved Handler System" found at "http://www.peanutfarmer.com/ticker/closed%20System%20Press%Release.pdf" on the Internet.

Portion of Information Sheet entitled "Pesticide Preview" including a description of "Phorate 20G" appearing at "http://www.peanutgrower.com/home/20003_aprilpesticide.html" on the Internet. This document mentions "EZ Load System".

A group of seven photographs believed to show a portion of the EZ Load System including the Zip and Go Phorate box and bag mentioned in the Information Sheet "Phorate 20G".

* cited by examiner

SYSTEM AND PACKAGE FOR DISPENSING FLOWABLE MATERIAL AND METHOD FOR PRODUCT DISPENSING

CROSS-REFERENCE TO RELATED APPLICATIONS

This application claims priority from provisional U.S. Patent Application No. 60/457,430, filed on Mar. 25, 2003.

BACKGROUND OF THE INVENTION

1. Field of Invention

This invention relates generally to dispensing systems, packages for such systems and methods of use, and more particularly to systems and flexible packages for dispensing flowable products from such packages and methods of dispensing such materials.

2. Description of Related Art

Heretofore one common method for dispensing flowable agricultural or other chemicals has entailed using a box, hopper or some other receptacle on a tractor. The chemicals for dispensing are introduced into the tractor box or hopper in one of two ways. In particular, the most common way of introducing such chemicals into the tractor box is to provide them in a flexible package, e.g., a gusseted package, a pouch or a bag. The package, pouch or bag is arranged to be manually opened, e.g., cut or torn to form a mouth through which the contents of the package can be poured. The tractor box or hopper typically includes an outlet through which the flowable material introduced can exit for application. The other way of introducing the chemical into the tractor box is through the use of a what is sometimes referred to as a "lock 'n load" system, such as that commercially available from Deere & Company under the trademark "Lid Fill Closed Handling System." That system basically comprises a specially designed returnable container or package for the agricultural chemical, e.g., an insecticide,. The package includes a transfer valve on it, which is adapted to be coupled to a mating valve on a lid of a hopper on a tractor or other vehicle. The hopper is arranged to dispense the agricultural chemical introduced into it from the package. Thus, when the valve of the package is coupled to the valve of the hopper lid, both valves automatically open so that the content in the package flow by gravity into the hopper for ultimate dispensing. When the package is removed from the hopper both valves automatically close, thereby resealing the package and the hopper.

While the foregoing prior art techniques and apparatus are generally suitable for their intended purposes, they leave much to be desired from one or more of the various aspects, simplicity of construction, ease of use, effectiveness, efficiency and economy. Thus, a need exists for packages for dispensing flowable materials, systems making use of such packages and methods for product dispensing making use of such packages and systems which address those aspects.

BRIEF SUMMARY OF THE INVENTION

This invention entails systems for dispensing flowable materials, e.g., granular or particulate agricultural chemicals, from packages containing such materials, and methods of dispensing such materials from the packages.

The system basically comprises a flexible package and a receiver apparatus for the package. The package has a hollow interior in which the flowable material is located and includes at least one wall portion formed of a penetratable material. The receiver apparatus comprises an opening for receipt of the package, a penetrating portion and an outlet. The at least one wall portion of the package is arranged to be penetrated by the penetrating portion of the receiver apparatus after the package is introduced into the opening, whereupon the flowable material is enabled to flow out of the package for dispensing out of the outlet of the receiver apparatus.

In accordance with one preferred aspect of this invention the receiver apparatus includes a penetrating portion comprising plural blades disposed in a generally pyramidal configuration and merging together at a point. Those plural blades are mounted within the receiver apparatus below the opening and with the point being directed upward towards the opening, whereupon when the package is moved through the opening the at least one wall of the package engages the point and the blades cut the aperture in the base wall of the package. The package is arranged to be moved through the opening by the force of gravity when it is placed in the opening.

In accordance with another preferred aspect of this invention the package includes a front panel having a linear bottom edge, a rear panel having a linear bottom edge and a gusseted bottom panel interconnecting the bottom edges of the front panel and the rear panel. Each of the panels is formed of a flexible material and having a first linear, side edge and a second linear side edge. The first and second linear side edges are disposed opposite and parallel to each other. The gusseted bottom panel includes a front gusset section and a rear gusset section. The front gusset section is connected to the front panel along the bottom edge of the front panel. The rear gusset section is connected to the rear panel along the bottom edge of the rear panel. The front and rear gusset sections are connected together along a central fold line extending parallel to the bottom edges of the front and rear panels. The front gusset section is secured to the front panel adjacent the first linear side edge of the front panel by a first angled linear seal line extending at an acute angle to the first linear side edge of the front panel. The rear gusset section is secured to the rear panel adjacent the first linear side edge of the rear panel by a second angled linear seal line extending at an acute angle to the first linear side edge of the rear panel. The front gusset section is secured to the front panel adjacent the second linear side edge of the front panel by a third angled linear seal line extending at an acute angle to the second linear side edge of the front panel. The rear gusset section is secured to the rear panel adjacent the second linear side edge of the rear panel by a fourth angled linear seal line extending at an acute angle to the second linear side edge of the rear panel. The front panel and the rear panel are secured to each other along the first linear side edge and along the second linear side edge.

The package is arranged to be filled with a flowable material and when so filled the package forms a four-sided regular geometrically shaped bottom portion, the bottom portion of the filled package having a generally planar base wall, a front wall portion, a rear wall portion, a first sidewall portion and a second sidewall portion. The front wall portion projects upward from the base wall along the linear bottom edge of the front panel. The rear wall portion projects upward from the base wall along the linear bottom edge of the rear panel. The first sidewall projects upward from the base wall between the front and rear wall portions on one side of the package. The second sidewall projects upward from the base wall portion between the front and rear wall portions on the opposite side of the package. The generally regular geometric shaped bottom portion of the package generally corresponds to the shape of the opening of the receiver apparatus, whereupon the package can be introduced into the opening so that the base wall of the package is penetrated by a portion of the system to form an aperture therein to enable the flowable material within the package to flow out of the package through said aperture for dispensing, without any portion of the package interfering with the free flow of the flowable material out of the package.

Another preferred aspect of this invention entails a method of dispensing a flowable material from a flexible package. The method basically comprises providing a package holding a flowable material. The package has a penetratable wall portion. A receiver apparatus is provided for receiving the flexible package. The receiver apparatus has a penetrating portion for penetrating the penetratable wall portion of the package. The package is placed into or onto the receiver apparatus and is moved, e.g., under the force of gravity, into engagement with the penetrating portion of the receiver apparatus, whereupon the penetrating portion of the receiver apparatus penetrates the penetratable portion of the package to enable the flowable contents of the package to flow thereout for dispensing by the receiver apparatus.

In accordance with one aspect of the method of this invention the bottom wall of the package defines the penetratable wall and has a center. The sidewall of the package extends about the entire periphery of the bottom wall. The penetrating portion of the receiver apparatus penetrates the bottom wall to form an aperture having plural legs radiating from the center of the bottom wall. Each of those legs terminates in an end portion located at a different position along the periphery of the bottom wall. The legs of the aperture form respective flaps in the bottom wall which are arranged to flex to form an outlet through which the flowable contents flow out of the package. In a preferred embodiment of the invention the bottom wall of the package is of a regular geometric shape, e.g., a square, rectangle, etc., having plural corners, and wherein the end portions of the legs of the cut terminate in respective ones of the plural corners.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
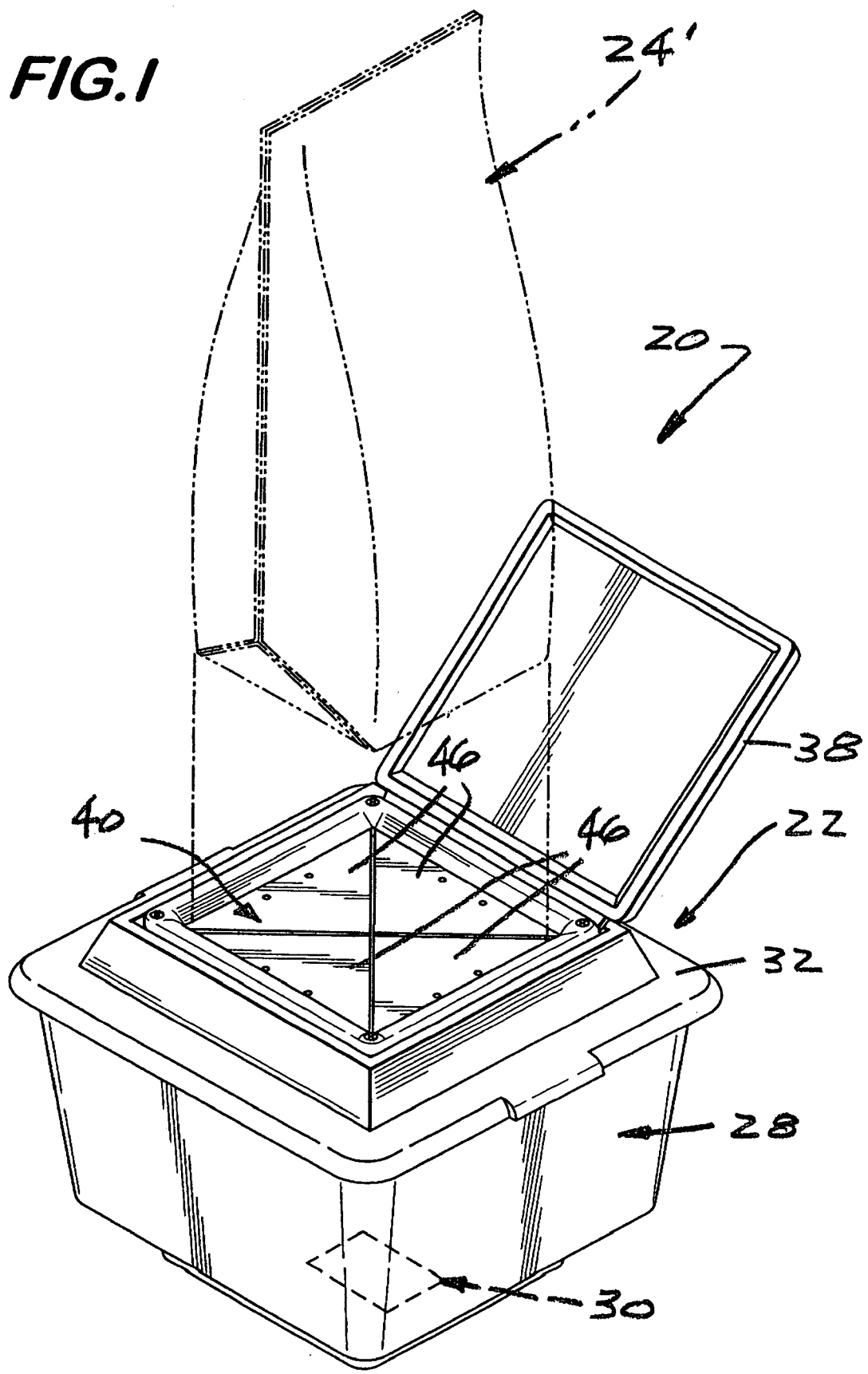
FIG. 1 is an isometric view of one preferred exemplary embodiment of a system for dispensing flowable materials constructed in accordance with this invention, with the system including an exemplary embodiment of a package (shown in phantom lines) constructed in accordance with this invention and containing a flowable material, e.g., a granular or particulate material, and a receiver apparatus for cooperating with the package to enable to material to flow therein for ultimate dispensing.
Figure 5:
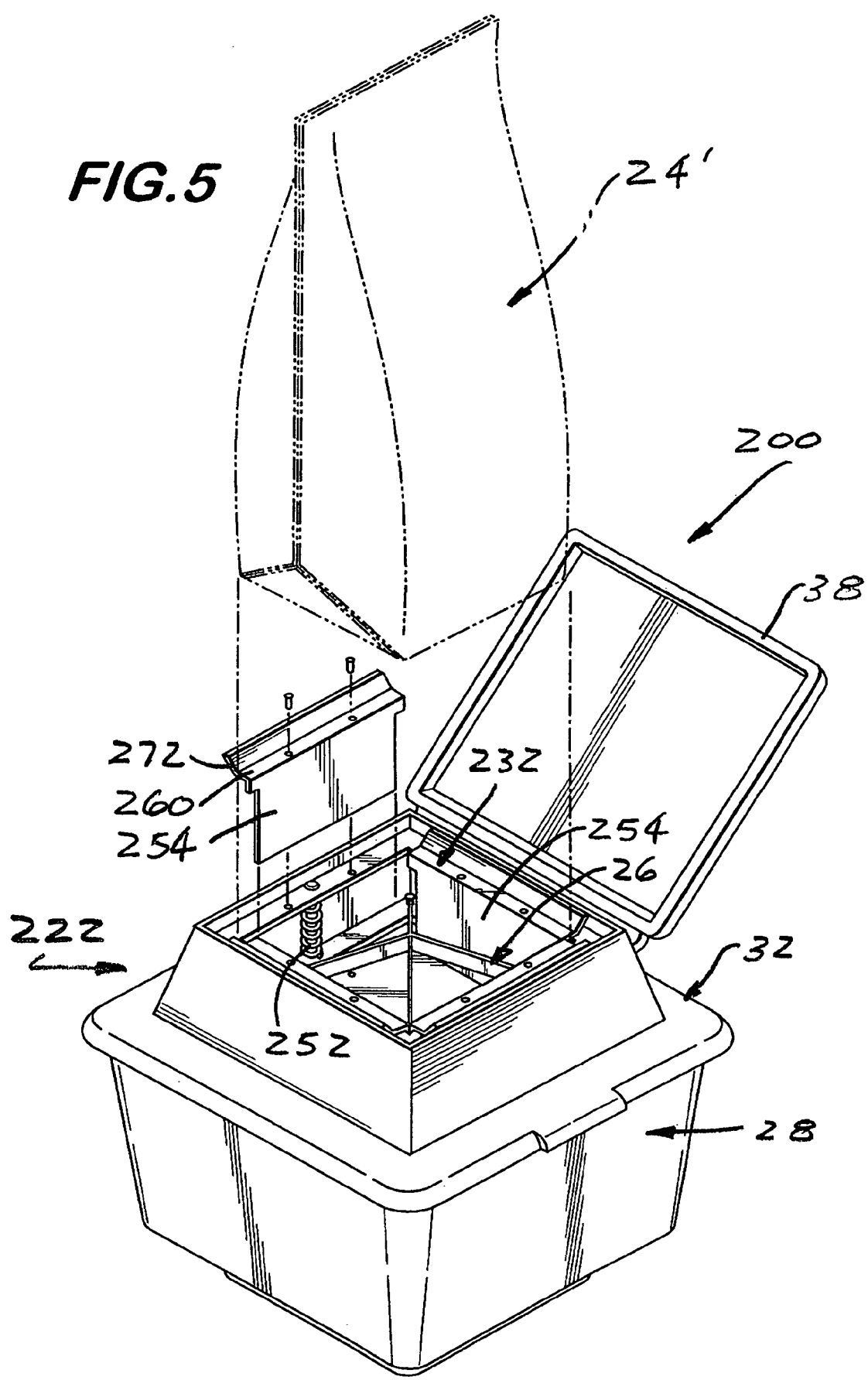
FIG. 5 is an isometric view, similar to FIG. 1, but showing an alternative preferred exemplary embodiment of the system of this invention.
Figure 6:
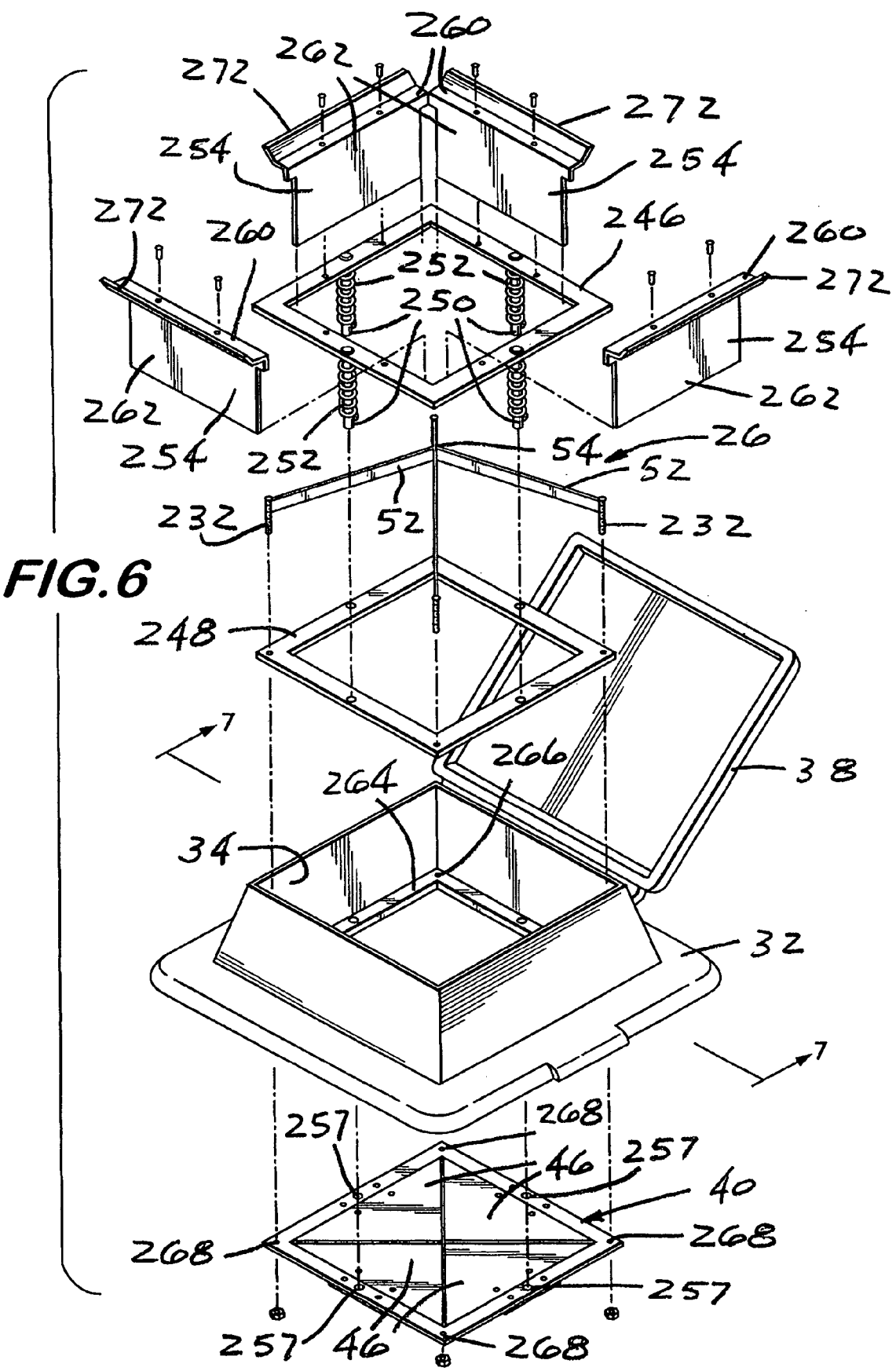
FIG. 6 is an exploded isometric view of the receiver apparatus of FIG. 5.
Figure 7:
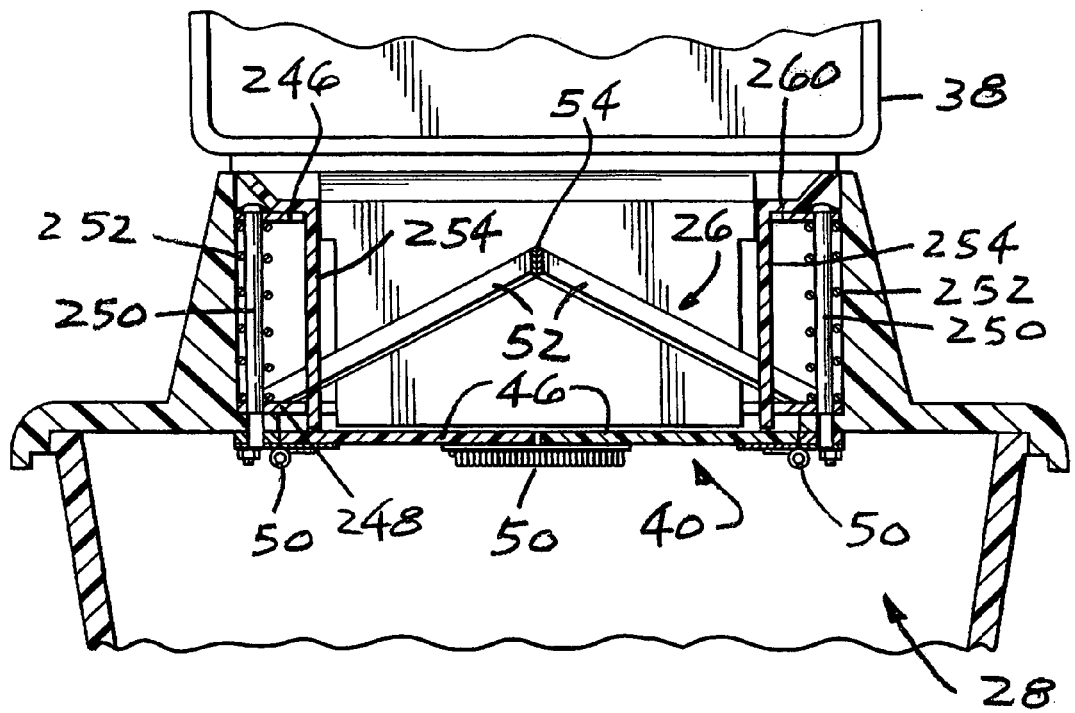
FIG. 7 is an enlarged side elevation view, partially in section, of the top portion of the receiver apparatus of FIG. 5 shown ready to receive the package of FIG. 1.
Figure 8:
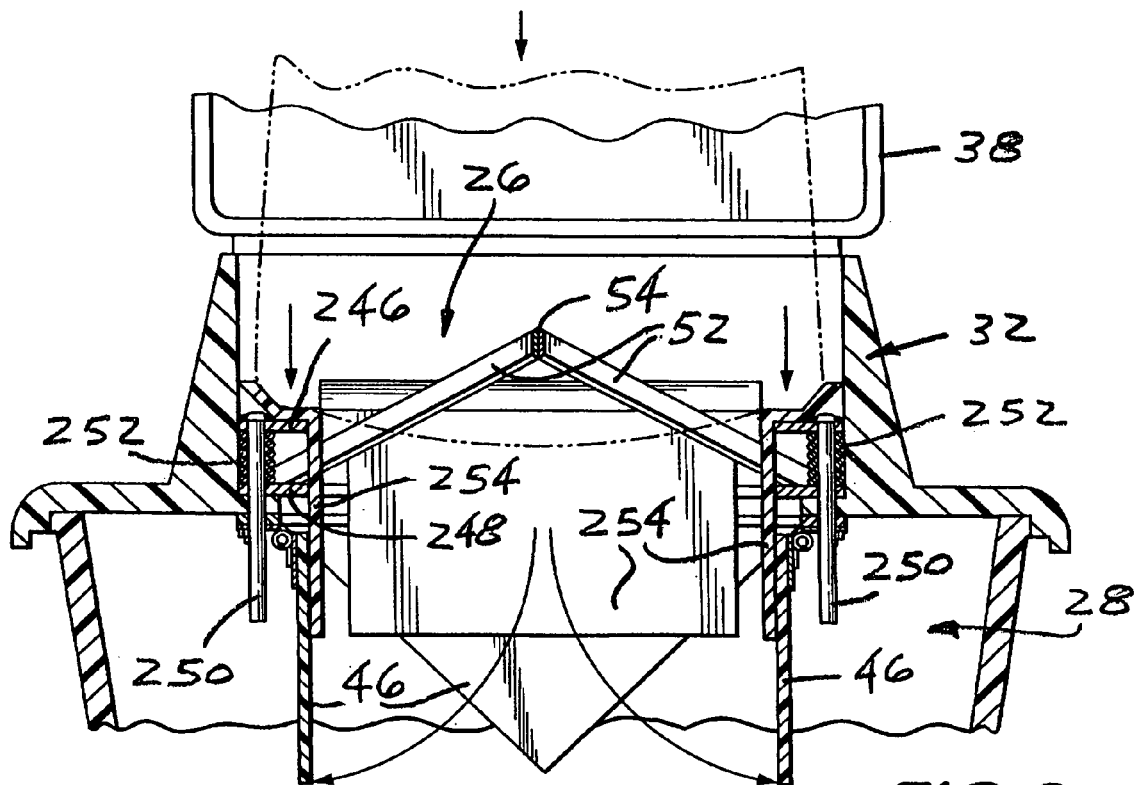
FIG. 8 is a view like FIG. 7, but showing the package being opened by the receiver apparatus so that the package's contents can readily flow out of the package and into a cavity in the receiver apparatus.
Figure 9:
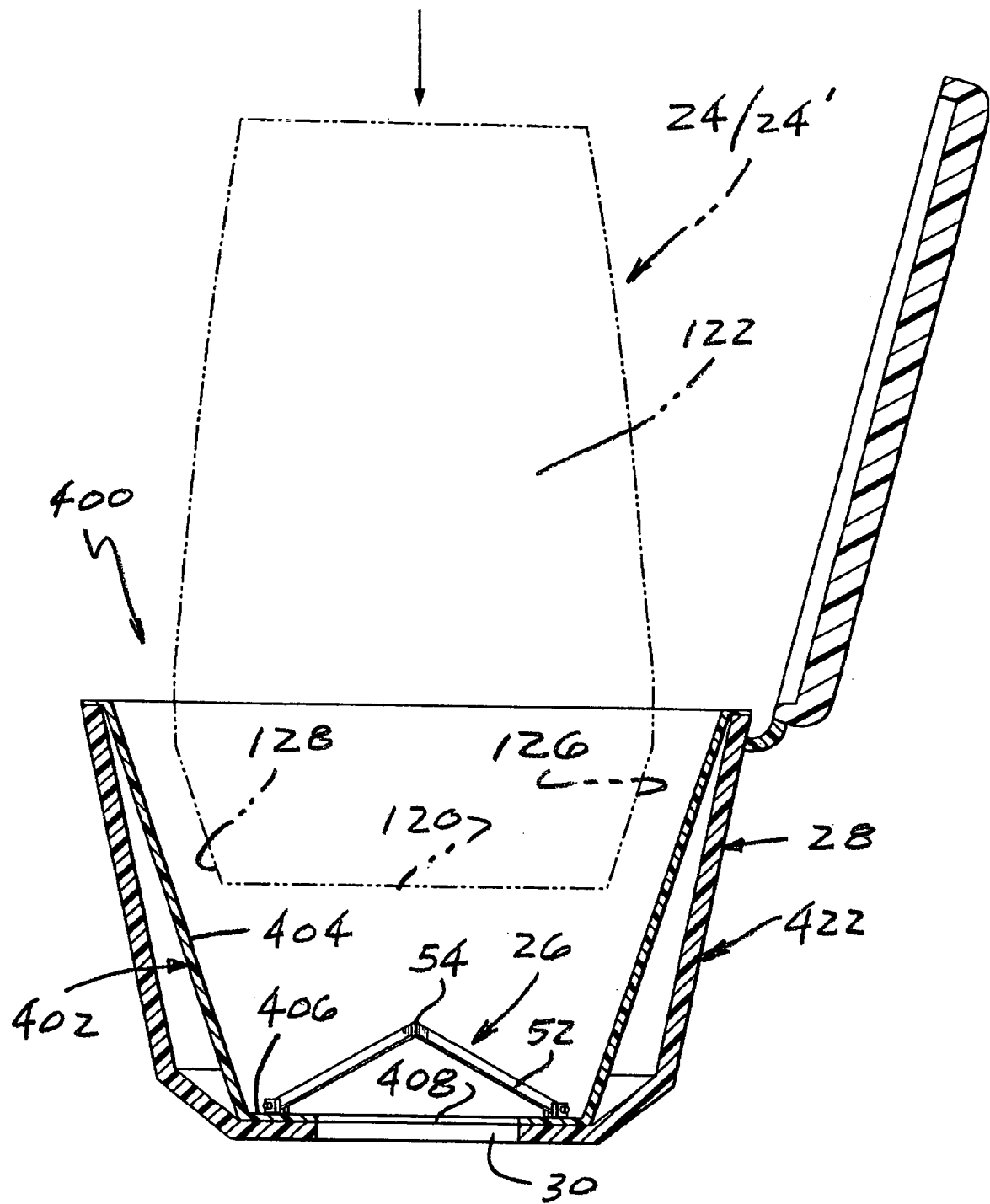
FIG. 9 is an side elevation view, partially in section, of another alternative preferred exemplary embodiment of the system of this invention.

Referring now to the various figures of the drawing wherein like reference characters refer to like parts, there is shown in FIG. 1 one exemplary embodiment of a dispensing system 20 constructed in accordance with one preferred exemplary embodiment of this invention. In FIGS. 5 and 9 there are shown other exemplary embodiments of dispensing systems constructed in accordance with this invention, those system being designated by the reference numbers 200 and 400, respectively. Each dispensing system basically comprises a receiver apparatus 22 suitable for mounting onto agricultural equipment, such as a tractor (not shown) and a flexible package 24 holding a flowable material, e.g., particulates, granules or liquids for use in agricultural applications.

Before describing the receiver apparatus 22 and the package 24 of the system 20, it should be pointed out that the use of the systems of this invention, e.g., exemplary systems 20, 200 and 400, is not confined to agricultural applications, but can be used in any application wherein a flowable material is to be dispensed from a flexible package.

As best seen in FIGS. 1–4 the receiver apparatus 22 basically comprises a hollow interior (to be described later) that is arranged to receive the flowable material (not shown, from the package 24. Once the material is within the hollow interior of the receiver apparatus it can be dispensed therefrom, as needed, in any conventional manner. The flowable materials contained within the package may comprise pesticides, herbicides, other agricultural chemicals or any other flowable material that is desired to be dispensed.

The receiver apparatus 22 will be described in detail later. Suffice it for now to state that the receiver apparatus 22 includes a penetrating assembly 26 (FIG. 2), e.g., plural elongated cutting blades arranged in a pyramidal configuration and a hopper 28 or other hollow member having an interior chamber. The penetrating assembly 26 is located at an entry way to the interior chamber of the hopper and is arranged to engage to cut or otherwise puncture or penetrate a portion of the package 24 introduced into the apparatus to enable the contents of the package to flow into the hopper 28 for ultimate dispensing therefrom via an outlet 30 (FIG. 1).

In the exemplary embodiment 20 and 200, of FIGS. 1 and 5, respectively, the penetrating assembly 26 is designed to penetrate, e.g., cut open, the bottom of the package 24 when the package is placed into (or alternately onto) a portion of the receiver apparatus 22, thus causing the product to be dispensed from the package into the hollow interior chamber of the hopper 28. In contradistinction, in the exemplary embodiment 400 of FIG. 9 the penetrating assembly, is designed to penetrate, e.g, cut open, the bottom of the package containing the flowable material when the package is placed into the hollow interior chamber of the hopper of that apparatus, thus causing the product to be dispensed from the package directly through the outlet of the hopper 28.

The receiver apparatus 20, 200 or 400 may be provided as integral or self-contained module or unit arranged to be attached to agricultural machinery, or may be constructed by modification of an existing product container, e.g., a conventional tractor hopper, by affixing a penetrating assembly and associated components of the receiver apparatus to the existing container (e.g., hopper).

In the exemplary preferred embodiment of FIG. 1, the penetrating assembly 26 is located underneath a lid 32 (to be described later) disposed over the interior chamber of the hopper 28. The lid 32 includes a central, e.g., square, opening 34 in it. A frame assembly 36, including a hinged cover 38, is mounted on the lid surrounding the periphery of the opening 34 via plural screws 39. The cover 38 is arranged to be pivoted to the open position shown in FIGS. 1 and 2 to expose the opening 34 in the lid. When the cover is pivoted open the receiver assembly 22 is ready to receive the package 24. An openable-closeable gate assembly 40, to be described later, is located in a recess 42 in the lid surrounding the opening 34. The gate assembly is arranged to open when a package 24 is inserted into the opening 34 to expose the bottom of the package to the penetrating assembly 26. The penetrating assembly is mounted on the underside of the lid 32 below the gate assembly 40.

As will be described later when the package 24 is introduced through the opening 34 and onto the gate assembly, its weight will cause leaf elements of the gate mechanism to pivot downward to create an opening through which the bottom wall of the package passes, whereupon the bottom wall of the package engages the penetrating assembly. The weight of the package carries it downward further causing the penetrating assembly to cut an aperture, e.g., create a X shaped cut, in the bottom wall of the package, whereupon the flowable contents of the package flow out of the aperture into the hollow interior of the hopper 28. The package 24 can then be removed from the receiver apparatus 22, whereupon the leaf elements 46 of the gate assembly 40 automatically close. This action prevents dust from exiting the hopper, e.g., becoming airborne. This is of some importance to prevent exposing operating personnel to dust of the particulate material, since such dust may be hazardous, e.g., be toxic. Moreover, the cover 38 of the lid 32 is arranged to be returned or pivoted to its closed position either manually or by some biasing means, e.g., a spring (not shown), to close off the opening 34 to prevent any foreign materials from gaining access to the hopper.

Figure 2:
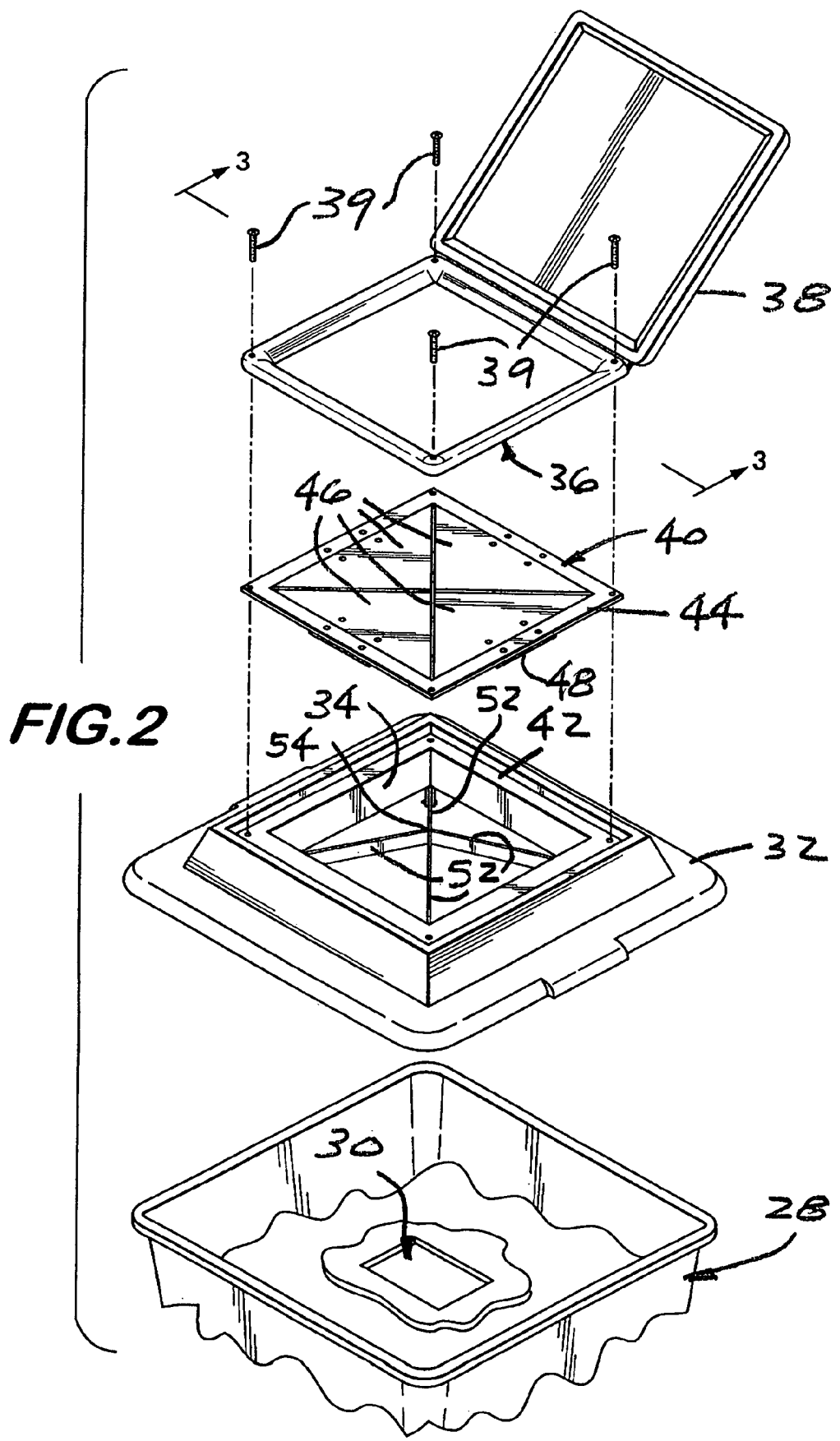
FIG. 2 is an exploded isometric view of the receiver apparatus of FIG. 1.
Figure 3:
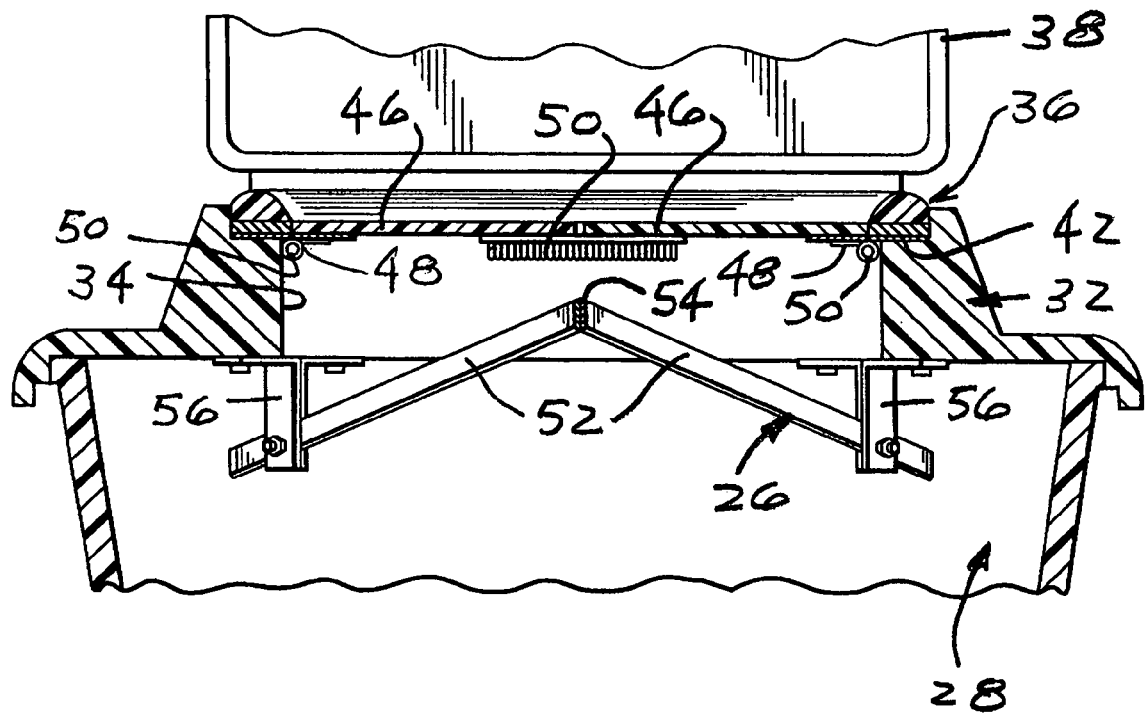
FIG. 3 is an enlarged side elevation view, partially in section, of the top portion of the receiver apparatus of FIG. 1 shown ready to receive the package of FIG. 1.
Figure 4:
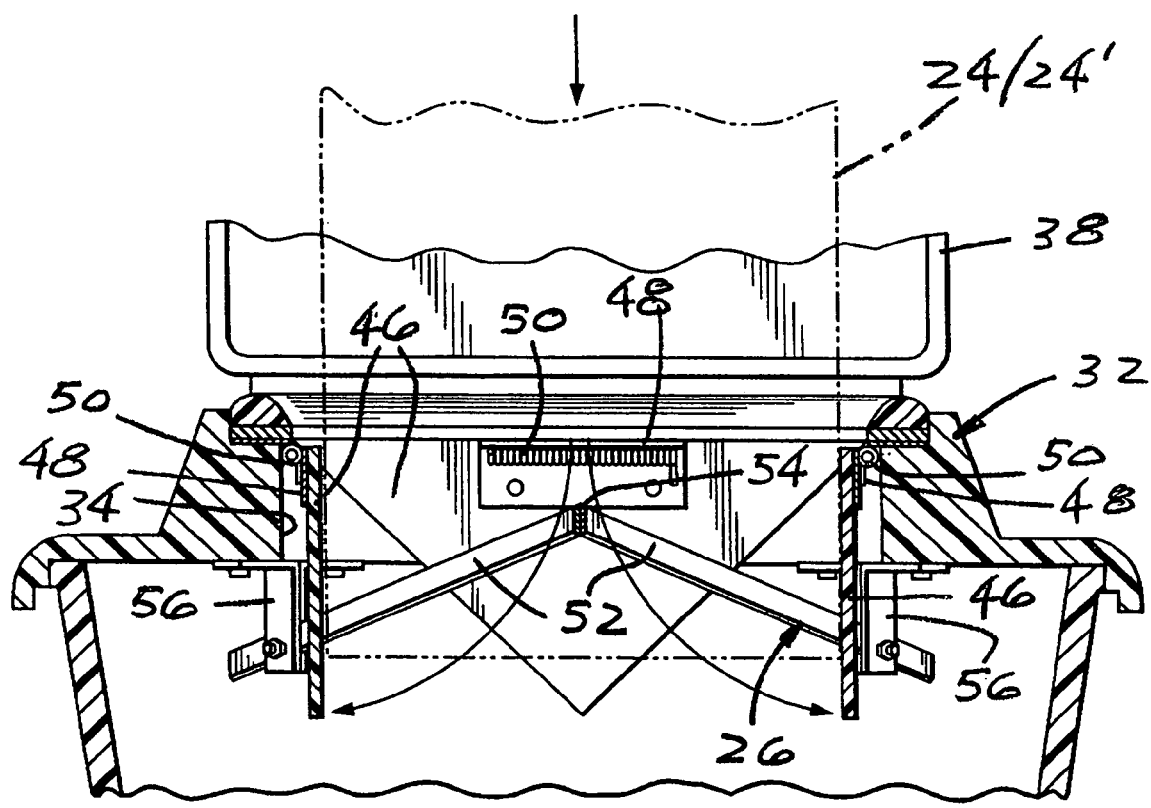
FIG. 4 is a view like FIG. 3, but showing the package being opened by the receiver apparatus so that the package's contents can readily flow out of the package and into a cavity in the receiver apparatus.

The gate assembly 40 is best seen in FIGS. 2–4 and basically comprises a square plate 44 having a square opening in which four triangular shape leafs 46 are mounted via respective spring-biased hinges 48. The springs 50 of the hinges 48 hold the leafs 46 in the closed position shown in FIGS. 1–3. When a package 24 is introduced into opening 34 in the receiver apparatus, the bottom wall of the package engages the leafs 46 to cause them to pivot downward from the closed position shown in FIG. 3 to the open position shown in FIG. 4. This action exposes the bottom wall of the package to the penetrating assembly 26.

Referring now to FIGS. 2 and 3 the details of the penetrating assembly 26 will now be described. As can be seen therein the penetrating assembly 26 basically comprises four elongated, linear blades 52 which are formed of any suitable material, e.g., stainless steel, and are oriented and connected together in a pyramidal configuration so that they merge at an upwardly directed apex or piercing point 54. The lower end portion of each blade 52 is mounted on the underside of the lid 32 via respective pairs of brackets 56. Each pair of brackets 56 is located immediately adjacent a respective corner of the opening 34 in the lid 32, so that each blade 52 extends from its respective corner of the opening to the piercing point or tip 54, which is located in the center of the opening 34. The piercing tip is located just below the plane of the leafs 46 of the gate assembly 40.

It should be pointed out at this juncture that the construction of the blades 52 making up the penetrating assembly 26 can be different from those described above. For example, each of the blades may be formed of an elongated linear bar or rod of any suitable material, e.g., a plastic to which a very thin linear razor blade or edge may be secured, e.g., riveted. Each blade extends along the entire length of the bar so that the cutting edge of the blade extends along the top surface of the bar but projects upward from it only a short distance, e.g., a millimeter or so. The minimally exposed edge of the blades in such an arrangement are provided to reduce the potential of serious injury should the user inadvertently come in contact with the blade(s).

Figure 17:
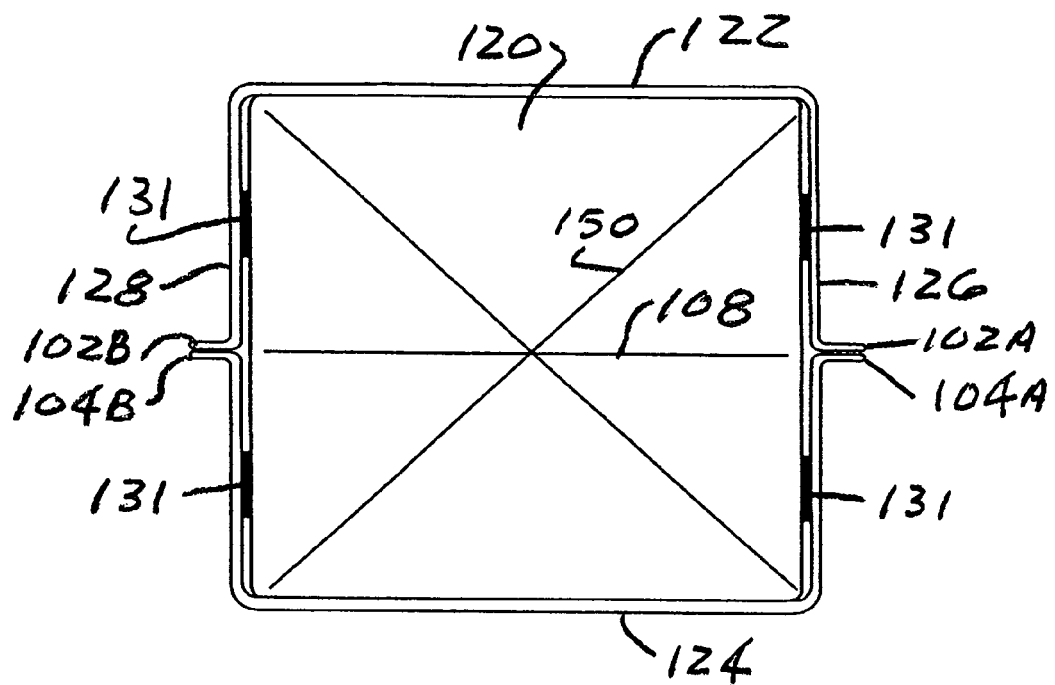
FIG. 17 is a bottom plan view of the packages shown in FIGS. 15 and 16.

Operation of the system 20 is as follows, when the hinged cover 38 is pivoted back, like shown in FIG. 3, the package 24 can be introduced through the opening 34 and disposed on the leafs 46 of the gate assembly 40. The weight of the package will cause the leafs to pivot downward against the bias of the springs 50 to the position shown in FIG. 4, whereupon the bottom portion of the package will pass through the opening 34 in the lid and the bottom wall of the package will engage the piercing point or apex 54 of the penetrating assembly 26. The action produces an X shaped cut 150 (FIGS. 17 and 18) in the bottom wall of the package. The X shaped cut increases in size as the package moves further downward. When the package's bottom wall has reached the lower ends of the elongated blades 52, the X-shaped aperture 150 in the bottom wall of the package will extend to the corners of the package, as shown in FIG. 17. This action creates four flaps 24A, 24B, 24C and 24D in the bottom wall of the package. These flaps will flex downward under the weight of the flowable material within the package, so that the contents of the package drop out of the package into the interior chamber of the hopper 28. This emptying action continues until the entire contents of the package have emptied into the hopper or the hopper has been filled, whichever comes first.

Once the flowable material is within the hopper, the package can be removed from the receiver apparatus 22 by merely lifting it upward. This action frees the leafs 46 of the gate assembly 40 so that they pivot back to the closed condition shown in FIGS. 1 and 3. The cover 38 of the receiver can then be closed to prevent anything from getting into the receiver apparatus and to seal the flowable material within the hopper. The flowable material within the hopper can then be dispensed, when desired and in the manner desired, by opening a mechanism or gate (not shown) at the outlet 30 of the hopper 28.

While any kind of package having a penetratable bottom wall can be used with the receiver apparatus 22, providing the package will fit through the opening 34, the packages of this invention have particular utility with receiver apparatus of the system 20. In this regard, as will be appreciated from the discussion to follow, their construction facilitates the effective and safe emptying of their contents into the receiver apparatus.

Figure 12:
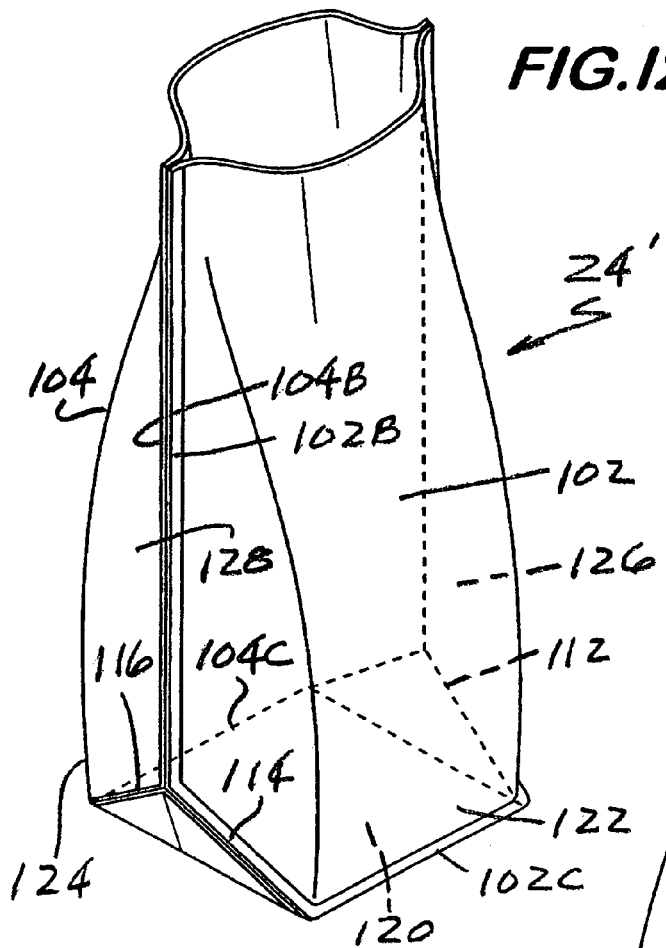
FIG. 12 is an isometric view of one exemplary package constructed in accordance with this invention, the package having particular utility for use with a receiver apparatus of the dispensing system of this invention.
Figure 15:
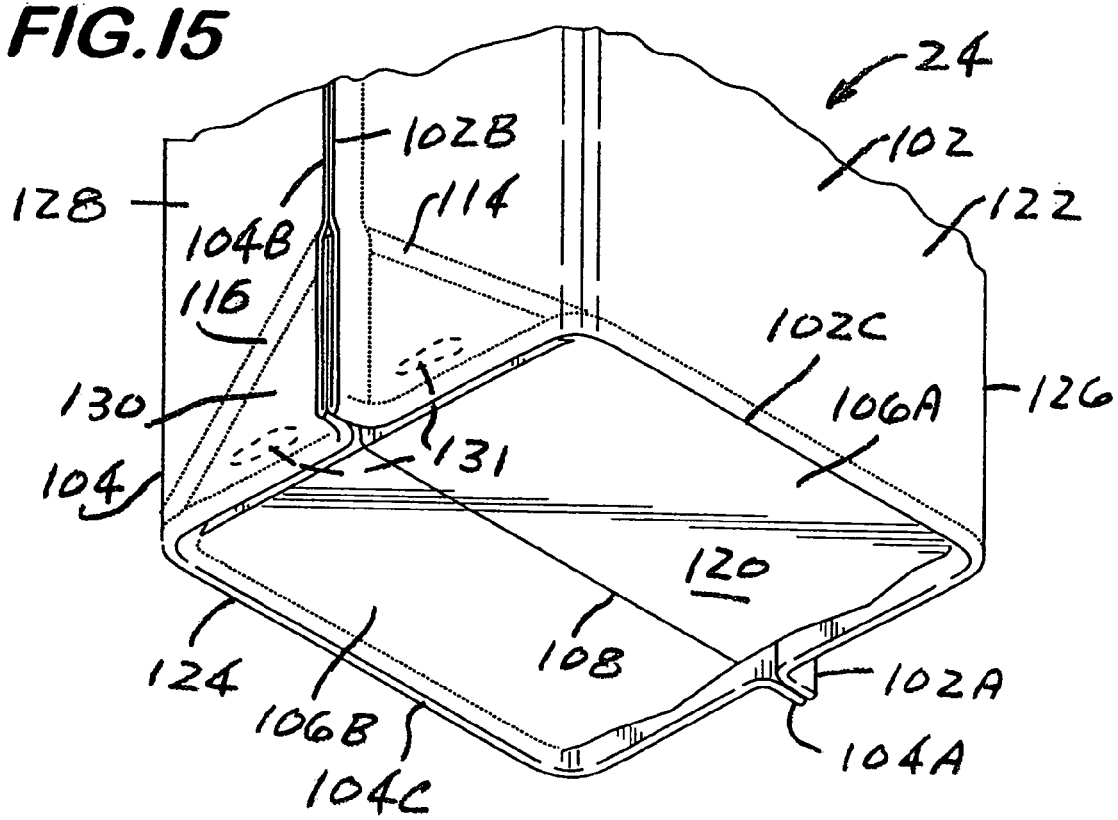
FIG. 15 is an enlarged isometric view of the bottom of an alternative exemplary package constructed in accordance with this invention, the package having particular utility for use with a receiver apparatus of the dispensing system of this invention.

In FIG. 15 there is shown one exemplary embodiment of a package 24 constructed in accordance with this invention. The package 24 basically comprises what is commonly referred to as a stand-up pouch or bag having a lower portion of parallelopiped shape. The package can be made of any suitable, flexible material, such as a laminate film, a coextruded film, combinations thereof, et., that are used by the flexible packaging industry. In this embodiment the bottom of the package 24 has a square shaped bottom wall, as seen in FIG. 17. An alternative package, which constitutes a modification of the package of FIG. 15, is shown in FIG. 12 and is designated by the reference number 24'. That package also includes a square bottom wall. The shape and cross sectional area of the bottom portion of each of the packages 24 and 24' is essentially the same as that of the opening 34 so that either package can be introduced into the opening 34 for passage therethrough as described above and so that the blades of the penetrating assembly can effectuate an X-shaped aperture or cut extending to each corner of the package. Thus, the flaps produced by the cutting action of the penetrating assembly encompass the entire bottom wall of the bag. This feature ensures the most effective and efficient emptying of the contents of the package, i.e., the flowable material should not be trapped at any location within the interior of the package.

Figure 10A:
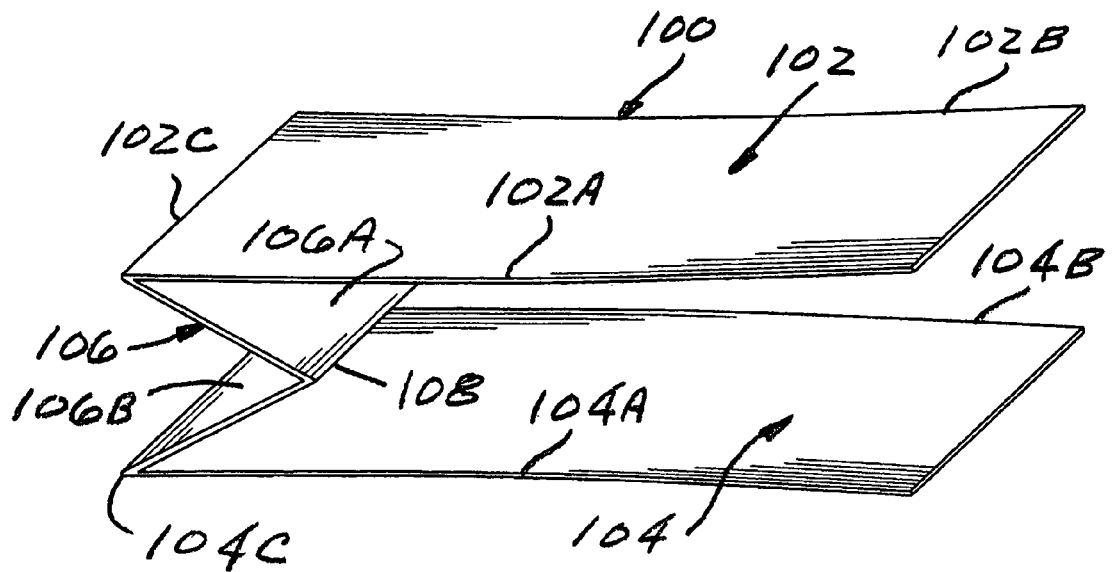
FIG. 10A is an isometric view showing an initial step in the manufacture of a package constructed in accordance with this invention, the package being formed of a single web of flexible material.
Figure 10B:
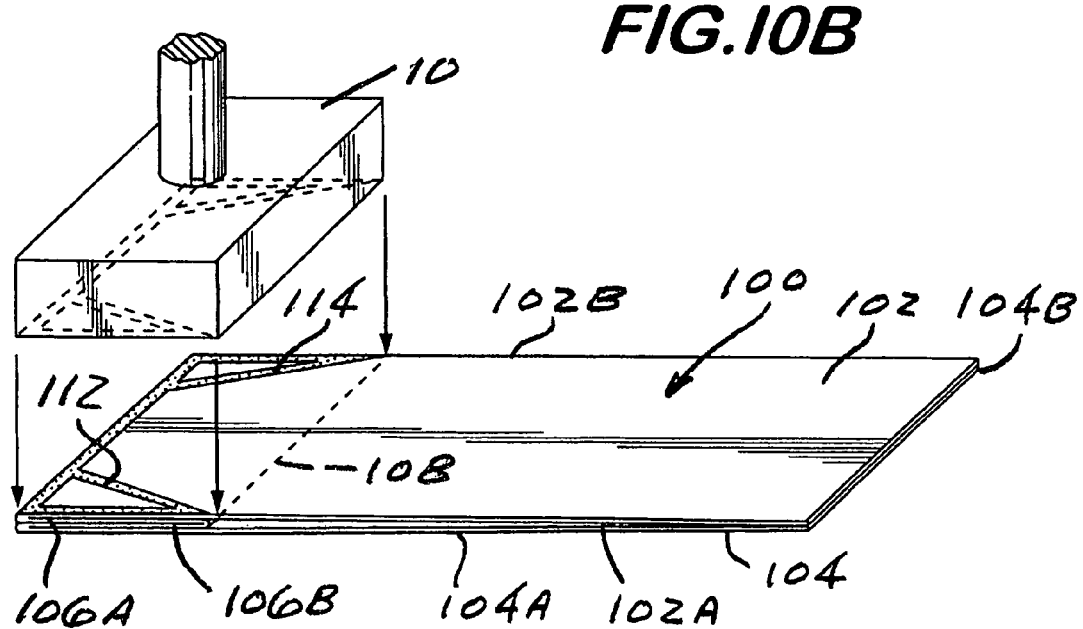
FIG. 10B is an isometric view of a sealing head forming a portion of apparatus for manufacturing the package from the web of FIG. 1 shown in use during the manufacture of the package.
Figure 10C:
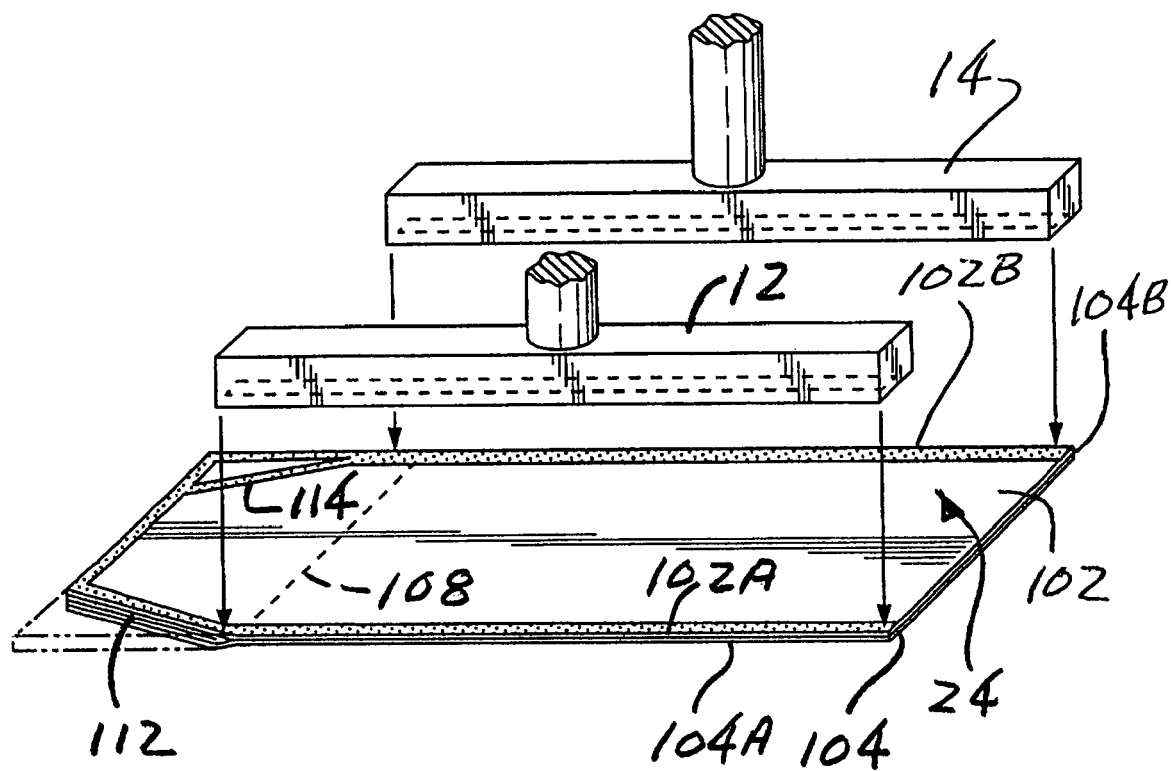
FIG. 10C is a view similar to FIG. 10B but showing other sealing heads of the apparatus shown in use during the manufacture of the package.

The package 24 can be fabricated various ways. One such way is shown in FIGS. 10A, 10B and 10C. In particular, a single web 100 of any suitable flexible material is folded into the configuration shown in FIG. 10A, to create a front panel 102, a rear panel 104 and a gusseted bottom panel 106. The front panel 102 has a first linear, side edge 102A and a second linear side edge 102B and a bottom linear edge 102C. The rear panel 104 has a first linear, side edge 104A and a second linear side edge 104B and a bottom linear edge 104C. The first and second linear side edges of the panels 102 and 104 are disposed opposite and parallel to each other. The gusseted bottom panel 106 interconnects the bottom edges 102C and 104C of the front panel and rear panels, respectively. The gusseted bottom panel 106 includes a front gusset section 106A and a rear gusset section 106B. The front gusset section 106A is connected to the front panel 102 along the bottom edge 102C (a fold line) of the front panel. The rear gusset section 106B is connected to the rear panel 104 along the bottom edge 104C (a fold line) of the rear panel. The front and rear gusset sections 106A and 106B, respectively, are connected together along a central inner fold line 108 extending parallel to the bottom edges 102C and 104C of the front and rear panels, respectively.

The bottom portion of the front panel 102, the gusseted bottom panel 106 and the rear panel 104 are arranged to be heat sealed or welded together in a conventional manner to form what is known in the art as a K-seal. Such seals are conventional and can be created by use of a conventional heated sealing bar 10 like that shown in FIG. 10B. In particular, the heated bar 10 is brought into engagement with the lower portion of either the front or rear panel (in this case the front panel 102)to flatten the contiguous portions of the web 10 as shown. The heated bar includes surface portions that cause the abutting flattened portions of the web 10 to be sealed to one another in a K-shaped configuration as shown. In particular, the heated bar 10 joins the front gusset section 106A to the front panel 102 adjacent the first linear side edge 102A of the front panel by a first angled linear seal line 112. The seal line 112 extends at an acute angle, e.g., 45 degrees, to the first linear side edge 102A. The heated bar 10 also joins the rear gusset section 106B to the rear panel 104 adjacent the first linear side edge 104A of the rear panel by a second angled linear seal line (not shown, but being located under seal line 112 when the web is in the state as shown in FIG. 10B). This seal line also extends at an acute angle, e.g., 45 degrees, to the first linear side edge 104A.

In a similar manner the heated bar 10 also joins the front gusset section 106A to the front panel 102 adjacent the second linear side edge 102B of the front panel by a third angled linear seal line 114 (FIGS. 10B and 15). The seal line 114 extends at an acute angle, e.g., 45 degrees, to the second linear side edge 102B. The heated bar 10 also joins the rear gusset section 106B to the rear panel 104 adjacent the second linear side edge 104A of the rear panel by a fourth angled linear seal line 116 (FIG. 15). The seal line 116 also extends at an acute angle, e.g., 45 degrees, to the second linear side edge 104B.

The heated bar 10 also seals the front gusset section 106A to the front panel 102 along the first side edge 102A from the fold line 118 to the bottom edge 102C. The heated bar 10 also seals the rear gusset section 106B to the rear panel 104 along the first side edge 104A from the fold line 118 to the bottom edge 104C. In a similar manner the heated bar 10 also seals the front gusset section 106A to the front panel 102 along the second side edge 102B from the fold line 118 to the bottom edge 102C. The heated bar 10 also seals the rear gusset section 106B to the rear panel 104 along the second side edge 104B from the fold line 118 to the bottom edge 104C.

Further still, the heated bar 10 seals the portions of the front panel 102 contiguous with the bottom edge 102C to the front gusset section 106A and seals the portions of the rear panel 104 contiguous with the bottom edge 104C to the rear gusset section 106A. These latter seals are optional inasmuch as the front panel is already connected to the front gusset section at the bottom edge or fold line 102C and the rear panel is already connected to the rear gusset section at the bottom edge or fold line 104C, since the panels are formed of a single web 10 of flexible material.

The package 24 is completed by sealing the unsealed portions of the first side edges 102A and 104A of the front and rear panels, respectively, together and by sealing the unsealed portions of the second side edges 102B and 104B of the front and rear panels, respectively, together. This is accomplished by a pair of conventional heated sealing bars 12 and 14, as shown in FIG. 10C. This completes the formation of the package 24.

Figure 11A:
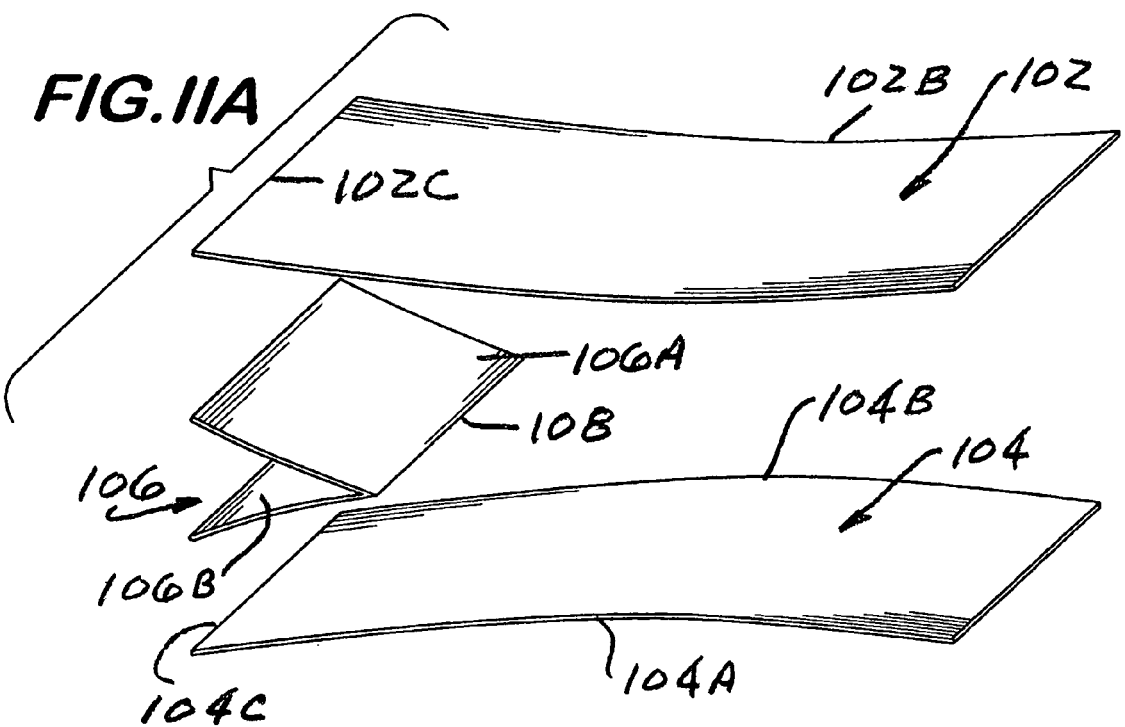
FIG. 11A is an isometric view showing an initial step in the manufacture of a package constructed in accordance with this invention, the package being formed of a three sections or webs of flexible material.
Figure 11B:
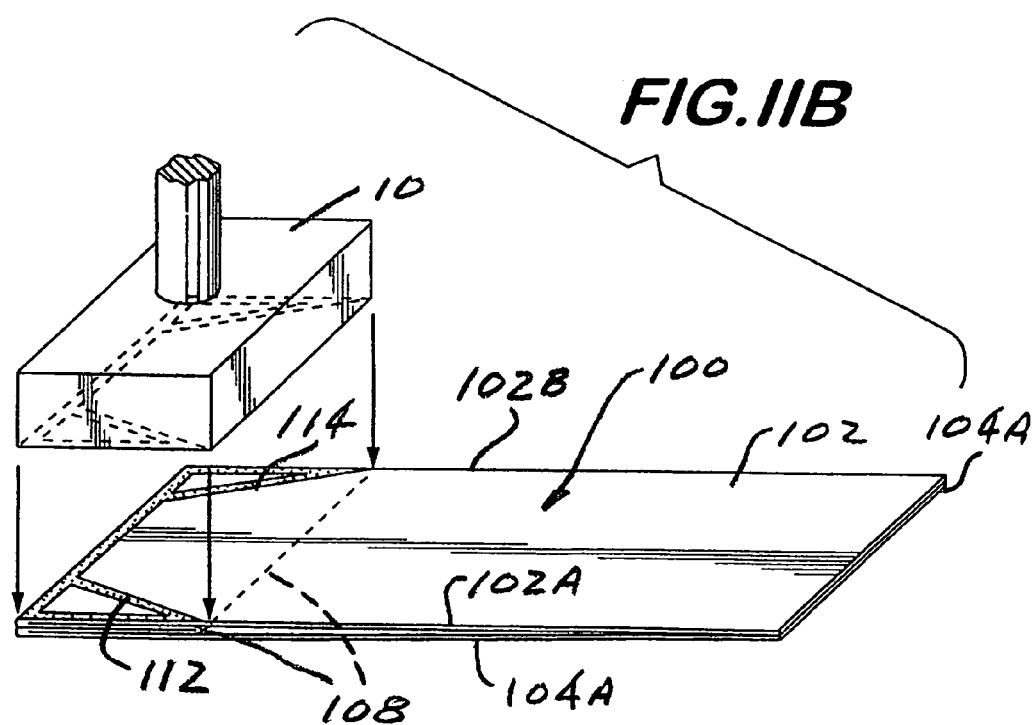
FIG. 11B is an isometric view of a sealing head forming a portion of apparatus for manufacturing the package from the web of FIG. 11A shown in use during the manufacture of the package.
Figure 11C:
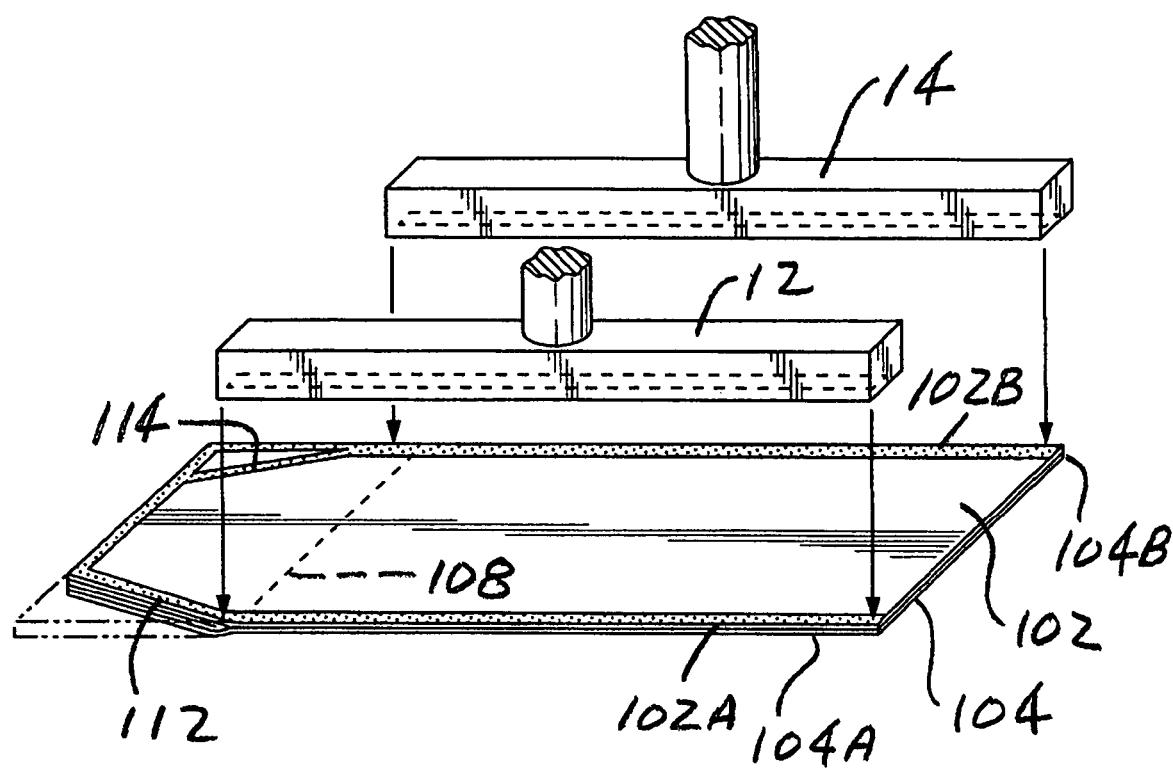
FIG. 11C is a view similar to FIG. 11B but showing other sealing heads of the apparatus shown in use during the manufacture of the package.

Alternatively, the package 24 can be fabricated by use of three webs of flexible material, like shown in FIGS. 11A, 11B and 11C. In particular, the package may be fabricated by using a separate web of flexible material for the front panel 102, a second web of flexible material for the rear panel 104 and a third web of flexible material for the gusseted bottom panel 106. The manner of fabricating the package 24 from three such separate panels is essentially the same as that described above with reference to FIGS. 10A–10C, except that the assembly process begins with three separate webs of material in lieu of one web of folded material. Thus, in the interests of brevity the assembly procedure will not be reiterated. Suffice it for now to state that the heated bar 10 creates the K-seal, the seal joining the front panel 102 to the front gusset section 106A of the separate bottom gusseted panel along the lower edge 102C and the seal joining the rear panel 104 to the rear gusset section 106B of the separate bottom gusseted panel along the lower edge 104C.

As should be appreciated by those skilled in the art, when the package 24 as just described is filled with a flowable material, its bottom portion will assume the parallelopiped shape, like shown in FIG. 15. In particular the bottom portion of the package 24 has a square bottom wall 120, a front wall 122, a rear wall 124 and a pair of opposed sidewalls 126 and 128. The bottom wall is formed by the now flattened or coplanar portions of the gusset sections 106A and 106B. The front wall is formed by the central portion of the front panel 102 and projects upward from the bottom edge 102C. The rear wall is formed by the central portion of the rear panel 104 and projects upward from the bottom edge 104C. The sidewall 126 is formed by the portion of the front panel 102 contiguous with the side edge 102A and the portion of the rear panel 104 contiguous with the side edge 104A. In a similar manner the sidewall 128 is formed by the portion of the front panel 102 contiguous with the side edge 102B and the portion of the rear panel 104 contiguous with the side edge 104B. Each of the walls 122, 124, 126 and 128 is generally planar at its lower end and extends upward generally perpendicularly to the bottom wall, whereupon the bottom portion of the package 24 is of a square generally parallelopiped shape. The upper portions of the package's walls taper together slightly, as is common with stand-up pouches and as shown in FIG. 12.

With the bottom of the package constructed as discussed above portions of it form a triangularly shaped multi-layer flap 130 on each side of the package adjacent the bottom wall. In particular, as best seen in FIG. 15 portions of the front and rear panels 102 and 104, respectively, contiguous with said second linear side edges 102B and 104B, respectively, and the third and fourth angled seal lines 114 and 116, respectively, form one flap 130. The other flap is formed on the opposite side of the package in a similar manner. These flaps could conceivably interfere with the complete and expeditious use of the system of this invention, e.g., they could interfere with proper placement of the package as it is dropped into the receiver apparatus and/or could get caught or otherwise interfere with the package as it is removed from the receiver apparatus. Therefore, in accordance with one preferred aspect of this invention the flaps are glued down. In particular, as best seen in FIGS. 15 and 17 plural patches 131 of an adhesive, e.g., a hot melt adhesive, is applied in the space between each flap and is associated sidewall of the package to hold the flaps in place so that they remain in the plane of the sidewalls 126 and 128. These patches 131 of adhesive are applied underneath the angled seals to hold the very lower folded portions of the inner surface of the flaps tightly against the package's sidewalls. It should be noted that the positioning of the adhesive patches 131 in the package 24 contrasts with adhesive that is sometimes applied to conventional flexible packaging to reduce stress at the gusset apex (in case the package were to be dropped inadvertently). In those applications the adhesive is typically placed closer to the gusset apex to facilitate that desired result.

In accordance with another preferred aspect of this invention portions of the package 24 can be cut away to result in a package 24' (shown in FIG. 12), but which exhibits the same advantages as the package 24. The package 24' is constructed identically to the package 24, except that the portions of the package that would otherwise form the flaps 130 are cut away during the fabrication of the package so that no flaps are created. In the interest of brevity the common components and structural details of the packages 24 and 24' will be given the same reference numbers and the description of their structure, arrangement and function will not be reiterated. Suffice it to say that the fabrication of the package 24' is accomplished in the same manner as described above with respect to package 24, except the corners of the bottom portion of the package are cut away, as shown by the phantom lines in FIG. 10C. In particular, as can be seen in that figure the portions of the front panel, the gusseted bottom panel and the rear panel lying outside and contiguous with the first angled seal line 112, and with the underlying and hidden second angled seal line, are severed or otherwise removed. So too, the portions of the front panel, the gusseted bottom panel and the rear panel lying outside and contiguous with the angled seal lines 114 and 116 are severed or otherwise removed.

Figure 18:
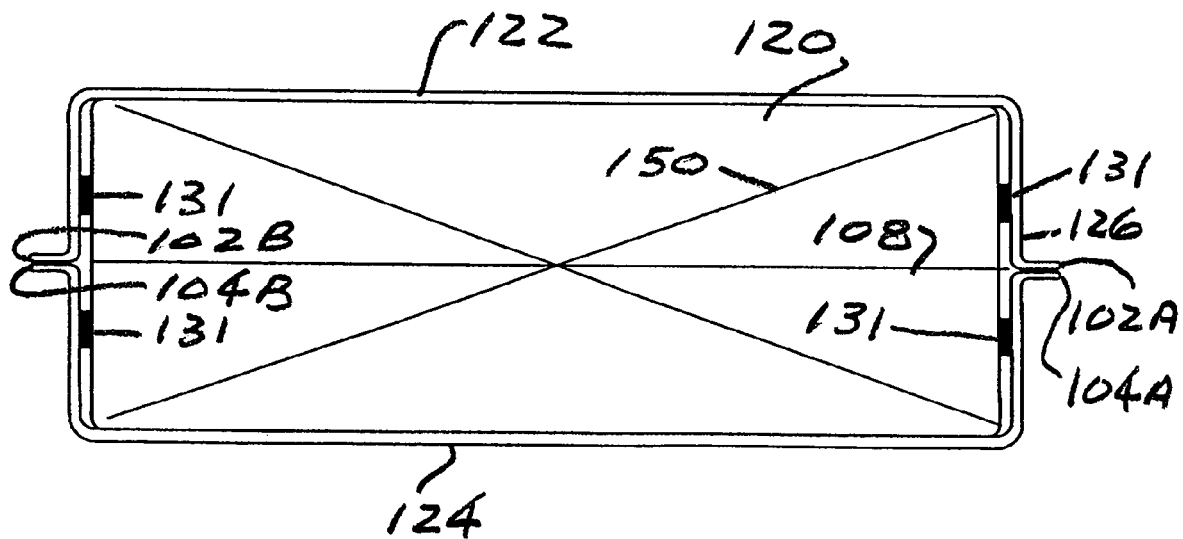
FIG. 18 is a view like FIG. 17, but showing an alternative shaped package constructed in accordance with this invention.

If desired the packages 24 and 24' can be constructed so that their resulting bottom wall is some other non-square, regular geometric shape, e.g., a rectangle. On such embodiment is shown in FIG. 18. As will be appreciated by those skilled in the art, if the bottom wall of the package is to be of rectangular shape the angle of the angled seals to their respective panel side edges has to be greater than 45 degrees. With such alternative shaped packages, the receiver apparatus 22 is preferably constructed so that its opening 34, gate assembly 40 and penetration assembly are all of a corresponding shape and size. This is important to ensure that the X-shaped aperture cut into the bottom wall of the package extends to each corner of the package. As discussed above, when this is accomplished the flaps formed by the X-shaped cut in the bottom wall of the package encompass the entire bottom wall, so that the contents of the package can empty expeditiously through the aperture. Obviously, if the package is constructed of other than square or rectangular shapes, the receiver apparatus should be constructed to closely accommodate that shape and to cut the bottom wall of the package to each of its respective corners. If the bottom wall of the package is round or oval, the receiver apparatus should be constructed to closely accommodate that shape and create flaps which extend to the periphery of the bottom wall.

Figure 14:
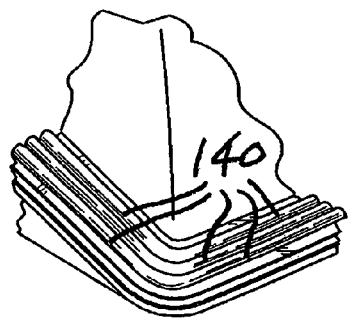
FIG. 14 is an enlarged isometric view of the portion of the package shown within the circular area designated by the legend "FIG. 14" in FIG. 13.
Figure 13:
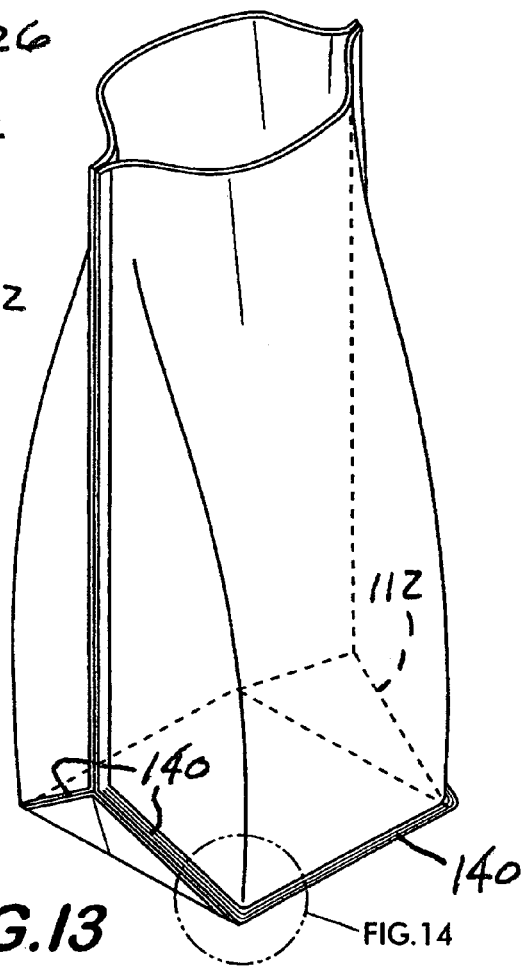
FIG. 13 is a view similar to FIG. 12, but showing an alternative embodiment of the package shown in FIG. 12.
Figure 16:
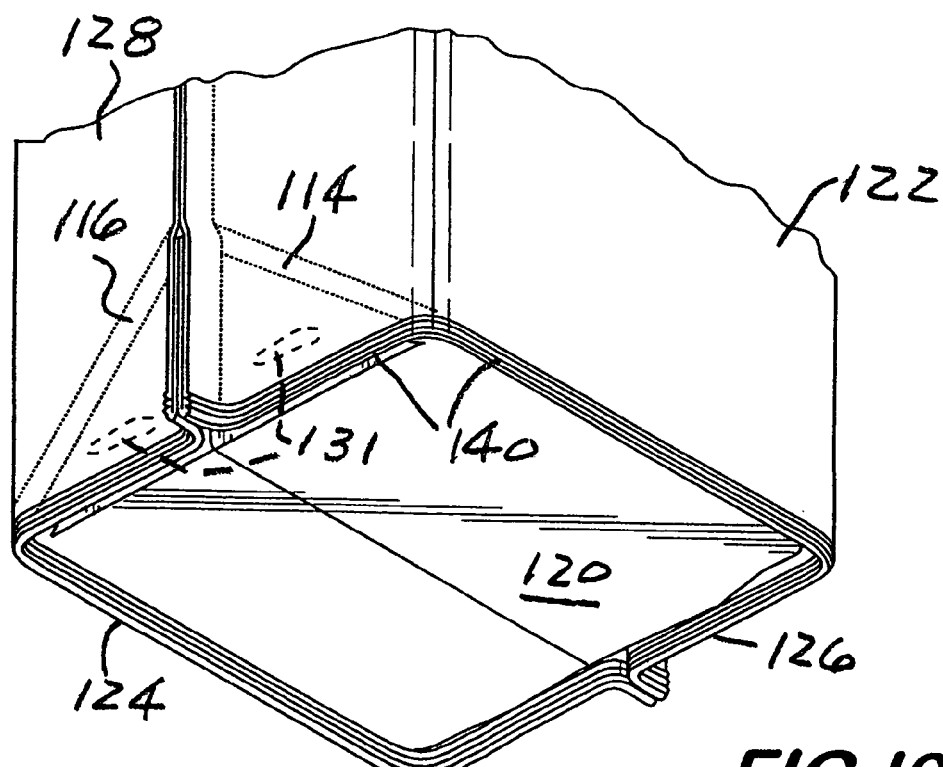
FIG. 16 is a view similar to FIG. 15, but showing an alternative embodiment of the package shown in FIG. 15.

FIGS. 13 and 16 illustrate variations of the package of FIGS. 12 and 15, in that each of these variations includes a reinforced seal which extends about the periphery of the bottom wall. For example, as best seen in FIG. 12 the heat seal along edge 102C of the front wall 122, the angled heat seals 114 and 116 of the sidewall 128, the heat seal along edge 104C of the rear wall 124, and the angled heat seal 112 and the other angled heat seal of the sidewall 126, each include longitudinally oriented corrugations 140. These corrugations are best seen in FIG. 14.

The reinforced heat seals can serve as a means to control or otherwise limit tear propagation beyond the perimeter of the bottom wall formed by a portion of the bottom gusset when the package is being opened or cut by the penetration assembly. In one preferred embodiment the control of the tear propagation is accomplished by altering the bottom heat seal design. For example, changing the number of longitudinal corrugations, changing the angle of the individual crimp points in the corrugations, etc. In FIG. 12 the reinforced heat seal extend into the angled seals, for further accomplishing the tear propagation control at the sidewalls 126 and 128. If desired, the reinforcement of the heat seals can be confined to the heat seals at the bottom edge 102C and 104C. In the embodiment of the package 24 shown in FIG. 16 the corrugations extend about the entire periphery of the bottom wall 120.

It should also be noted that the package material itself may be designed to facilitate, impede, or otherwise control a desired propagation characteristic. In one preferred embodiment the package material is constructed of a combination of materials laminated or otherwise bonded together in such a way to produce a desired tear propagation characteristic. In another preferred embodiment, only portions of the package may be constructed to produce a desired tear propagation characteristic. For example, in one preferred embodiment the front and back panels of the package are constructed of conventional materials, but the bottom gusset is constructed of a laminate or other material designed to produce a desired tear propagation characteristic.

Furthermore, the package material may be constructed so that a desired amount of force will consistently pierce the package. In one preferred embodiment, the package material is constructed so that it is resilient to abuse and provides the barrier properties necessary to ensure the product is protected, but is also designed so that it will puncture and initiate the tear propagation whenever the package is brought into communication with the penetration assembly with at least a predetermined force.

Referring now to FIGS. 5–8 an alternative preferred dispensing system 200 will now be discussed. The system 200 includes a receiver apparatus 222 and a package 24. The receiver apparatus is in many ways similar in construction to the receiver apparatus 22 described above. Thus, the common components of the receiver apparatus 22 and 222 will be given the same reference numbers and the details of their construction, arrangement and operation will not be reiterated in the interest of brevity. The system 200 can make use of any of the packages 24 or 24' described above.

As can be seen in FIG. 5, the penetrating assembly 26 is associated with a movable support assembly 232 located at the lid 32 of the hopper 28. The movable support assembly 232 is arranged to receive and hold the package 24/24' above the hollow interior of the hopper 28, while enabling it to move downward with respect to the penetrating assembly 26, whereupon the package 24/24' is penetrated so that its contents are dispensed, e.g., drop, into the hopper. The movable support assembly 232 also includes an openable-closeable gate mechanism 40 (FIG. 6) that opens when the product is dispensed from the package 24 to enable the product to flow into the hopper 28, and then closes after the product has been successfully transferred from the package into the hopper.

The lower end of each blade 54 of the penetrating assembly 26 has a threaded bolt 244 secured thereto. Each bolt is arranged to fixedly mount the penetrating assembly 26 on the lid 32, as will be described later. The movable support assembly 232 basically comprises a square shaped planar top frame member 246, a square shaped planar bottom frame member 248, four elongated linear rods 250, four compression springs 252, four panel guard members 254, and the heretofore mentioned openable-closeable gate assembly 40, in the form of a plate 44 having four hinged leafs 46.

Each of the four panel guard members 254 includes a horizontally disposed flange portion 260 from which a rectangular shaped panel 262 projects downward. The flange portion 260 of each member 254 is arranged to be disposed upon and secured to a respective portion of the top frame member 246. Such securement can be effected by any suitable means, e.g., fasteners extending through aligned holes in the flange portion 260 and in the associated portion of the top frame member 246. When the guard members are secured to the top frame member, their panels 262 extend downward through the hollow interior of the bottom frame member 248 to form a downwardly extending throat or passageway leading toward the hollow interior of the hopper 28, with the gate assembly plate 44 and its four hinged leafs 46 interposed between the throat and the hollow interior of the hopper.

The bottom frame member 48 is disposed upon and secured to the upper surface of a peripheral lip or flange 264 of the lid 32. To that end, the bottom frame member includes mounting holes 266 in each of its corners. The plate 44 of the gate assembly 40 is arranged to be fixedly secured to the undersurface of the lip or flange 264 of the lid. To that end, the plate 44 includes a square periphery having a mounting hole 268 in each of its corners. The bolts 244 extending downward from each of the blades 52 of the penetrating assembly 26 extend through the holes 266 in the bottom frame member 248, through aligned holes (not shown) in the lip or flange 264 of the lid and through the holes 268 in the plate 44 of the gate assembly 40. Each of these bolts is arranged to receive a respect nut to secure the bolts in place, thereby tightly sandwiching the lip or flange 264 between the plate 256 and the bottom frame member 248. This fixedly secures the penetrating assembly 26 with respect to the lid 32 so that the piercing point 54 extends upward.

Each of the four rods 250 is oriented vertically and extends downward from the top frame member 246 to and through respective holes in the bottom frame member 248. In particular the top end of each rod 250 is fixedly secured, via a nut (not shown) to the top frame member 246. The lower end of each rod extends through a hole in the bottom frame member 248, with a respective compression spring disposed about each rod and interposed between the top frame member 246 and the bottom frame member 248. The free end of each of the rods also extends through respective holes 257 (FIG. 6) in the periphery of the plate of the gate assembly 40. With this arrangement the top frame member 246 and the guard members 254 mounted thereon are arranged to move downward with respect to the lid 32 and to the fixedly mounted penetrating assembly 26 by the application of a downward force onto the flange portion 260 of the guard members 254. This downward force is automatically applied when a package 24/24' is placed on the flange portion f60 of the guard members. In particular, when the hinged cover 38 is pivoted back, like shown in FIG. 5, a package 24/24' can be extended through the opening 34 to enable the bottom wall of the package to rest upon the flange portions 260 of the guard members 254. The weight of the package will cause the guard members and the supporting top frame member 246 to move downward with respect to the bottom frame member 248, against the bias provided by the compression springs 252. As the package moves downward its bottom wall will engage the piercing point or apex 54 of the penetrating assembly 26, whereupon an X shaped aperture 150 will be produced in the lower wall of the package by the blades in the same manner as described earlier.

The lower or free end of each of the guard members 254 will engage a respective one of the leafs 246 of the gate assembly 40 when the movable support assembly 232 starts to move downward under the weight of the package 24/24'. This action will cause each of the leafs 46 to pivot downward at their respective hinges, thereby creating an opening between the adjacent leafs through which the flowable material can pass. Thus as soon as the package 24/24' begins to be pierced or penetrated by the blades 52, its contents can flow downward out of the X-shaped aperture 150, through the opening between the leafs 46 and into the hollow interior of the hopper 28. This action will continue until the entire contents of the package has emptied into the hopper or the hopper is filled whichever comes first. The downwardly extending members 254 forming the throat directs the contents to the hopper and thus ensures that none of the flowable material engages the rods/springs, which action could impede the downward movement of the movable support assembly (particularly if the flowable material is a particulate or granular).

Once the package has been emptied it can be removed from the receiver apparatus by merely lifting it out of the lid 32, whereupon the natural bias produced by the springs 252 will lift the movable support assembly 232 back to the uppermost position. Alternatively, the receiver apparatus may include an interlock (not shown) so that once the package has descended to a predetermined point the interlock will automatically engage to hold the moveable support assembly 232 in that position until the package is lifted with sufficient force to disengage the interlock and return the movable support assembly back to it uppermost position. The pivotable cover 38 can then be pivoted to the closed position to prevent anything from getting into the receiver apparatus.

In order to facilitate the disposition of the package 24/24' on the movable support assembly, e.g., to prevent it from shifting around, each of the panel members 254 includes an angularly extending flange portion 272 which conjoin to encircle or surround the bottom wall of the package 24 when it is disposed on the flange portions 260.

Referring now to FIG. 9 another alternative dispensing system 400 will now be described. The system 400 includes a receiver apparatus 422 and a package 24. The receiver apparatus is in many ways similar in construction to the receiver apparatus 22 and 222 described above. Thus, the common components of the receiver apparatus 22, 222 and 422 will be given the same reference numbers and the details of their construction, arrangement and operation will not be reiterated in the interest of brevity. The system 400 can also make use of any of the packages 24 or 24' described above or a modification thereof, e.g., a package whose front wall, rear wall and sidewall portions flare slightly outward and upward from the base wall instead of being perpendicular to the base wall 120.

The receiver apparatus 422 includes a hollow chamber or hopper 28, having a lid 38 which is pivotably mounted thereon to expose the interior of the hopper when the lid is pivoted back like shown in FIG. 9. The interior chamber of the hopper 28 can include a walled insert 402 to direct the package 24/24' introduced into the hopper towards the outlet 30. The insert 402 includes four sidewalls 404 which taper downward to a bottom wall 406. The bottom wall is of the same shape and same cross sectional area as the bottom of the package 24/24' to be inserted into the receiver apparatus 422. The bottom wall includes a opening 408 of the same size and shape as the outlet 30 of the hopper and is centered over that outlet. The use of the insert 402 is optional, e.g., to direct and center a package having flared walls projecting upward from the base wall.

The penetrating assembly 26 is identical in construction to penetrating assembly 26 of the embodiment 20 and 200 except that it is fixedly secured to either the bottom wall 406 of the insert or directly to the base wall 482 of the hopper 28 if no insert is used in the system 400. In either case the penetrating assembly is located over the outlet 30 of the hopper.

Accordingly, when the package 24/24' is placed in the receiver apparatus 422, the bottom wall of the package will initially engage the piercing point 42 of the penetrating assembly. The weight of the package itself will cause the package to move downward with respect to the piercing point, whereupon an X-shape aperture 150 will be cut into the bottom wall. The contents of the package can then flow out of the X-shaped aperture between the blades 52 making up the penetrating assembly 26 and out through the outlet 30. The tapering side walls of the package may facilitate dispensing of its contents.

It should be pointed out that the penetrating assemblies as described above need not cut or sever the package at its bottom wall to produce an opening therein for the contents to flow out. Thus, if desired, the package may include a rubber boot or other penetratable reclosing means positioned at the bottom wall where some penetrating member of the receiver apparatus is located to open the package thereat when the package is placed into or onto the receiver apparatus and such that when the package is removed from the receiver apparatus, the rubber boot or other reclosing means recloses to impede any residual product in the package from flowing out.

As should be appreciated by those skilled in the art by making use of a package which is filled with any type of flowable material and which is arranged to be automatically dispensed therefrom into a receiver apparatus upon receipt of the package by the receiver apparatus, enables one to readily dispense a predetermined or pre-measured amount of the flowable material into any vat, hopper, vessel or other hollow body. Thus, the subject invention is not limited to use with agricultural dispensing tractors or any other type of movable applicator.

Without further elaboration the foregoing will so fully illustrate my invention that others may, by applying current or future knowledge, adopt the same for use under various conditions of service.

What is claimed is:

1. A package for use in a system for dispensing a flowable material, the system including an opening, at least a bottom portion of which is of a regular geometric shape and into which said package is arranged to be disposed, said package being arranged to be filled with a flowable material and comprising a front panel having a linear bottom edge, a rear panel having a linear bottom edge and a gusseted bottom panel interconnecting said bottom edges of said front panel and said rear panel, each of said panels being formed of a flexible material and having a first linear, side edge and a second linear side edge, said first and second linear side edges being disposed opposite and parallel to each other, said gusseted bottom panel including a front gusset section and a rear gusset section, said front gusset section being connected to said front panel along said bottom edge of said front panel, said rear gusset section being connected to said rear panel along said bottom edge of said rear panel, said front and rear gusset sections being connected together along a central fold line extending parallel to said bottom edges of said front and rear panels, said front gusset section being secured to said front panel adjacent said first linear side edge of said front panel by a first angled linear seal line extending at an acute angle to said first linear side edge of said front panel, said rear gusset section being secured to said rear panel adjacent said first linear side edge of said rear panel by a second angled linear seal line extending at an acute angle to said first linear side edge of said rear panel, said front gusset section being secured to said front panel adjacent said second linear side edge of said front panel by a third angled linear seal line extending at an acute angle to said second linear side edge of said front panel, said rear gusset section being secured to said rear panel adjacent said second linear side edge of said rear panel by a fourth angled linear seal line extending at an acute angle to said second linear side edge of said rear panel, said front panel and said rear panel being secured to each other along said first linear side edge and along said second linear side edge, said package being arranged to be filled with a flowable material and when so filled said package forms a four-sided, regular geometrically shaped bottom portion, said bottom portion of said filled package having a generally planar base wall, a front wall portion, a rear wall portion, a first sidewall portion and a second sidewall portion, said front wall portion projecting upward from said base wall along said linear bottom edge of said front panel, said rear wall portion projecting upward from said base wall along said linear bottom edge of said rear panel, said first sidewall projecting upward from said base wall between said front and rear wall portions on one side of said package, said second sidewall projecting upward from said base wall portion between said front and rear wall portions on the opposite side of said package, a first flap portion formed of portions of said front and rear panels contiguous with said first linear side edge and said first and second angled seal lines, respectively, and a second flap portion formed of portions of said front and rear panels contiguous with said second linear side edge and said third and fourth angled seal lines, respectively, said first flap portion extending over said first sidewall between said first and second angled seal lines and being adhesively secured to said first sidewall, said second flap portion extending over said second sidewall between said third and fourth angled seal lines and being adhesively secured to said second sidewall, said generally regular geometric shaped bottom portion of said package generally corresponding to the shape of the opening of the system, whereupon said package can be introduced into the opening so that said base wall of said package is penetrated by a portion of the system to form an aperture therein to enable the flowable material within said package to flow out of said package through said aperture for dispensing, without any portion of said package interfering with the free flow of the flowable material out of said package.

2. The package of claim 1 wherein said first flap is adhesively secured to said first sidewall immediately adjacent said base wall and said second flap is adhesively secured to said second sidewall immediately adjacent said base wall.

3. The package of claim 2 wherein at least a portion of the periphery of said base wall is constructed to control the propagation of the cut in said package.

4. The package of claim 3 wherein said at least a portion of the periphery of said base wall comprises portions contiguous with said front and rear wall portions.

5. The package of claim 4 wherein said portions of said periphery of said base wall are corrugated.

6. The package of claim 5 wherein said corrugated portions of said package comprise crimped heat seals.

7. The package of claim 1 wherein each of said angled linear seals extends at approximately 45 degrees to its associated linear side edge.

8. The package of claim 1 wherein each of said angled linear seals extends at an angle greater than 45 degrees to its associated linear side edge.

* * * * *